United States Patent [19]

McEowen

[11] 4,148,119
[45] Apr. 10, 1979

[54] METHOD OF FABRICATING FLEXIBLE JOINTS

[76] Inventor: Victor R. McEowen, 379 Pittsfield Dr., Worthington, Ohio 43085

[21] Appl. No.: 793,930

[22] Filed: May 5, 1977

Related U.S. Application Data

[63] Continuation-in-part of Ser. No. 663,273, Mar. 3, 1976, Pat. No. 4,064,007.

[51] Int. Cl.² ............................................. B21D 53/10
[52] U.S. Cl. .................................................. 29/149.5 B
[58] Field of Search ................... 29/148.4 B, 149.5 B; 148/12 B, 154; 403/76, 122; 72/39, 340, 352, 356

[56] References Cited

U.S. PATENT DOCUMENTS

| 2,614,317 | 10/1952 | Deüssen | 29/148.4 B |
| 2,733,086 | 1/1956 | Latzen | 29/149.5 B |
| 2,973,227 | 2/1961 | Glavan | 29/149.5 B |
| 3,243,212 | 3/1966 | May | 403/122 |

OTHER PUBLICATIONS

Metals Handbook; 8th Edition; vol. 2, Heat Treating, Cleaning & Finishing; pp. 91, 92 (1964).

Primary Examiner—Michael J. Keenan

[57] ABSTRACT

A method of fabricating flexible joints such as are used in automotive steering linkages or the like wherein each housing is provided with an integral internal spherical bearing surface formed during the forging and inner cavity machining operations. The method is further characterized by the production of ball studs for such flexible joints which include integrally formed lubrication grooves.

2 Claims, 11 Drawing Figures

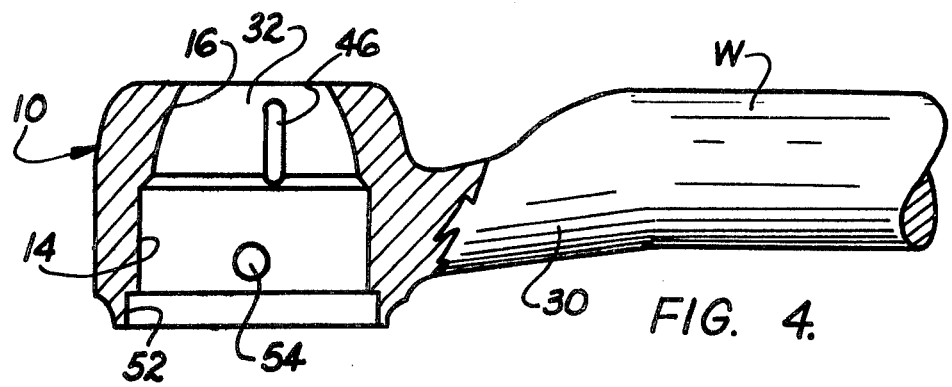
FIG. 4.
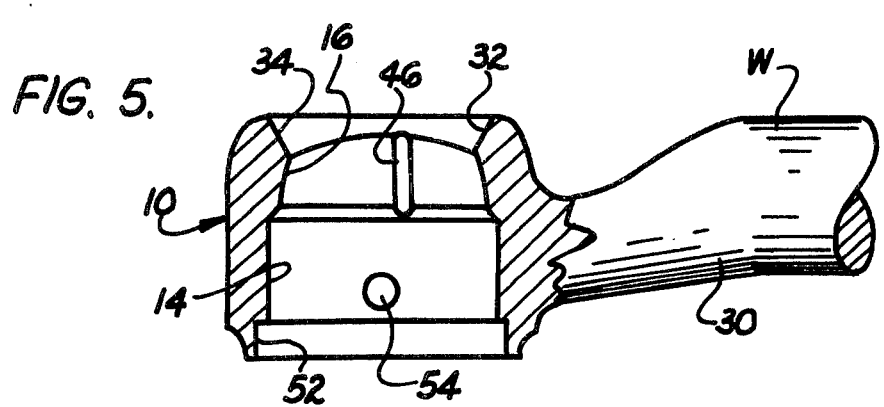
FIG. 5.
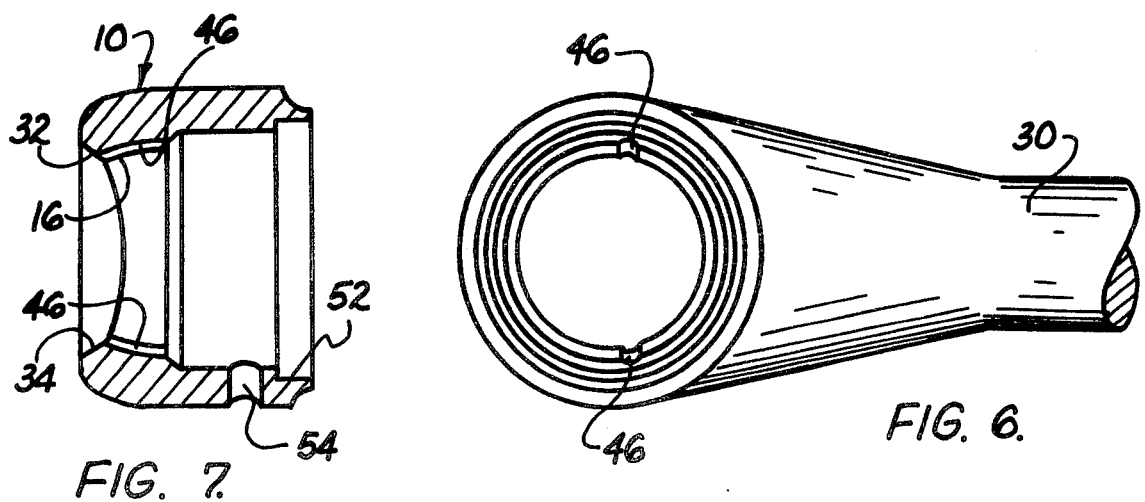
FIG. 7.
FIG. 6.

METHOD OF FABRICATING FLEXIBLE JOINTS

REFERENCE TO CO-PENDING APPLICATION

This application is a continuation-in-part of my co-pending application Ser. No. 663,273 filed Mar. 3, 1976, now U.S. Pat. No. 4,064,007.

BACKGROUND OF THE INVENTION

This invention relates generally to flexible joints and more particularly to a new and improved method of fabricating housing for ball joints such as are used in automotive steering linkages or the like.

PROBLEMS IN THE ART

It is presently the practice in the art to fabricate ball joints from forged housing provided with separate internal spherical bearing inserts for supporting the male ball studs. In many instances the spherical bearing inserts have been formed in synthetic resinous materials but a problem has been present in that such plastic bearing materials have been lacking in longevity under high stress operating conditions, particularly when operated in high temperature environments. Operation of automotive pivot joints in hot environments has only recently been dictated by the required polution control devices added within the hood shells of the engine compartments.

In an effort to offset the high temperature environment problems, pivot joints have recently been fabricated with spherical bearings formed of annular metal inserts which overcome the heat problem but which require highly accurate machining operations both with respect to the fabrication of the metal inserts and the required annular seat supporting surface must be accurately located and formed in the housing.

SUMMARY OF THE INVENTION

In general, the present invention comprises a novel method of producing pivot joint housings at high rates of production with such pivot joint housings including integrally formed spherical bearing surfaces which bearing surfaces are located and shaped simultaneously with the forging and internal machining of the housings.

As another aspect of the present invention, the method comprises the additional step of forming lubrication grooves in the spherical bearing surface by a coining operation performed in between the above-mentioned forging a machining operations. This provides grease reservoir grooves in the bearing surface without the presence of aberrations in the finished bearing surface.

As still another aspect of the present invention the above mentioned lubrication grooves are asymmetrically located with respect to the spherical bearing surface to prevent machine tool chatter during the final machining of the surface.

As another aspect of the present invention the pivot joint in one of its embodiments includes a novel method of fabricating ball studs wherein the lubrication grooves are formed in the spherical bearing surface of the ball stud during the forging thereof.

As still another aspect of the present invention the novel method in one of its embodiments comprises a novel ball stud construction which includes a forged head portion that includes a refined spherical bearing surface devoid of surface film and decarbonization.

It is, therefore, an object of the present invention to provide an improved method of fabricating pivot joints which include a housing portion provided with an integral spherical bearing surface.

It is still another object of the present invention to provide a method of fabricating pivot joints that includes a housing portion provided with integral hardened spherical bearing surfaces that include lubrication grooves located in the bearing surfaces without the presence of spherical aberrations adjacent the grooves.

It is another object of the present invention to provide a novel method of fabricating pivot joints of the type described that comprises a novel ball stud that includes lubrication grooves in the spherical bearing surface thereof, said grooves being integrally formed in the bearing surface during the forging thereof.

It is still another object of the present invention to provide a novel method of fabricating pivot joints of the type described that comprises a novel ball stud that includes a refined spherical bearing surface that is devoid of surface film normally resulting from the heat treating operation.

Further objects and advantages of the present invention will be apparent from the following description, reference being had to the accompanying drawings wherein preferred forms of embodiments of the invention are clearly shown.

BRIEF DESCRIPTION OF THE DRAWINGS

FIG. 3 through FIG. 5 are side elevational views, partially in section, of the workpiece of FIG. 2 in various steps of formation;

FIG. 6 is a bottom elevational view of the workpiece corresponding to FIG. 5;

FIG. 7 is an end sectional view of the workpiece of the preceding figures;

DESCRIPTION OF THE PREFERRED EMBODIMENTS

Figure 1:
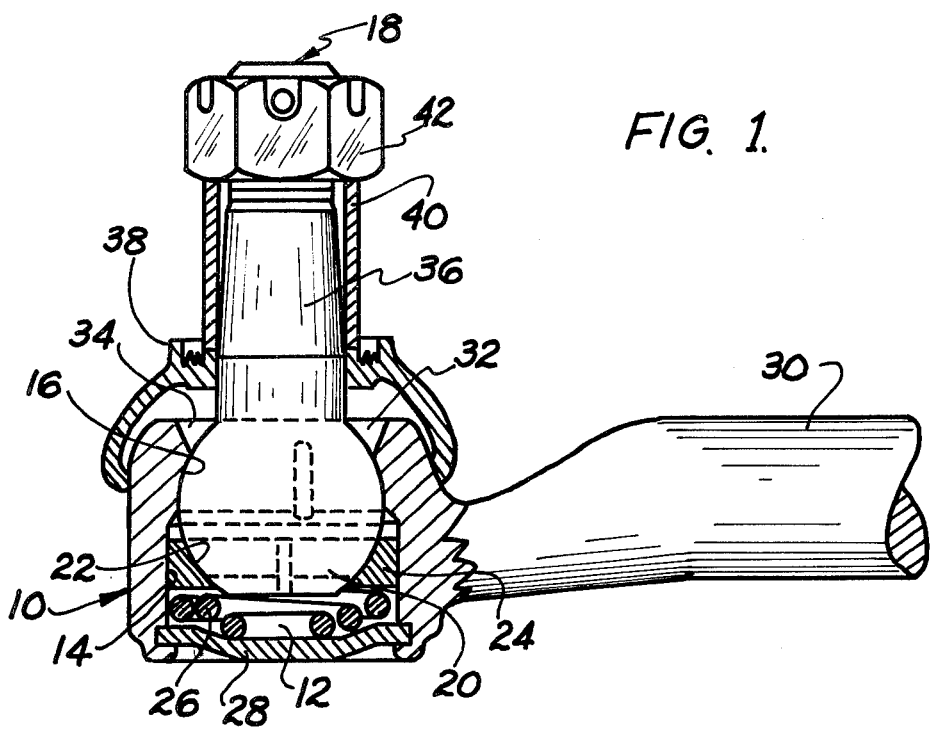
FIG. 1 is a side sectional view of a ball joint including a housing construction in accordance with the present invention.

Referring in detail to the drawings, FIG. 1 illustrates a typical pivot joint including a housing constructed in accordance with the present invention, with such housing being indicated generally at 10. The housing includes a cavity 12 that includes an inner wall surface 14 and a spherical bearing surface 16.

With continued reference to FIG. 1, a ball stud is indicated generally at 10. The housing includes a cavity 12 that includes an inner wall surface 14 and a spherical bearing surface 16.

With continued reference to FIG. 1, a ball stud indicated generally at 18 includes a ball shaped end 20 which is pivotally supported by bearing surface 16 as well as by a bearing surface 22 formed on a removable bearing insert 24.

Bearing insert 24 is urged inwardly by a compression spring 26 which is interposed between an end closure 28 and the bearing insert. The housing further includes a shank portion 30 as well as a top opening 32 which includes a tapered wall 34 the latter permitting angular movement of the shank 36 upon pivoting thereof.

The assembly of FIG. 1 also includes a dust cover 38, sleeve 40, and nut 42.

Figure 2:
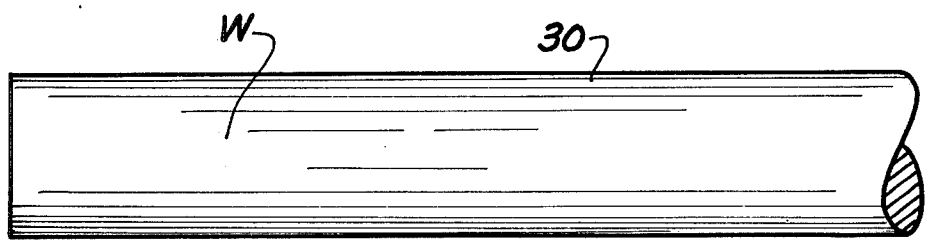
FIG. 2 is a partial side elevational view of a workpiece used in forming the housing of FIG. 1.

Referring next to FIG. 2, the above mentioned housing 10 is formed from a workpiece W which consists of a rod carbon steel. A suitable steel material is referred to as the middle carbon type, such as SAE 1040.

Figure 3:
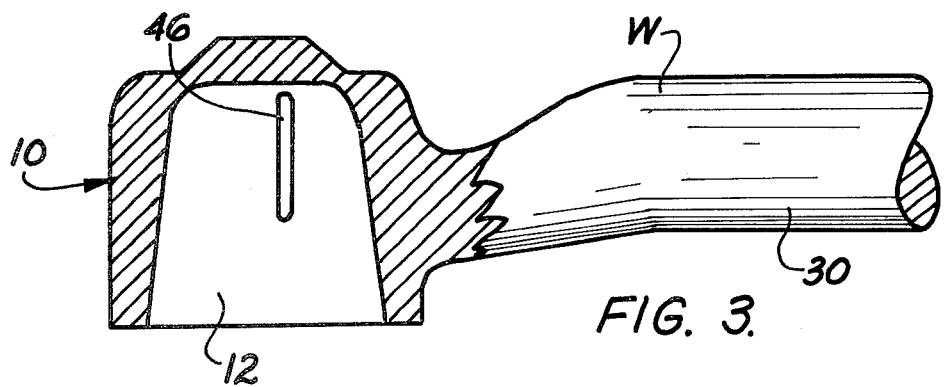

After the workpiece W has been sheared to length from bar stock, it is heated and forged to the shape shown in FIG. 3 wherein the housing 10, with the cavity 12, have been forged to the shape illustrated.

The workpiece is next subjected to a coining operation to form the grease grooves 46 with such grooves being eccentrically located so as not to be directly opposite each other as seen in FIG. 6.

In accordance with the present invention the workpiece W is subjected to an internal machining operation using a circular milling cutter so as to machine away the surface decarbonization and accurately locate and finally shape and finish the previously mentioned spherical bearing surface 16. Inner wall portion 14 is also machined at the same time to remove the taper left by the forging die.

A bottom hole 32 is also formed in the housing as well as a groove 52 for receiving the end closure 28. Such bottom hole 32 and groove 52 can be cut at the same time the wall surface 14 and bearing surface 16 are machined.

It should further be mentioned that during the internal machining the grease grooves 46 are cut down in length and any surface aberrations present in FIG. 3 are machined away such that the bearing curvature will be accurately produced. As still another operation, a radial hole 54 is formed through the wall of the housing for the subsequent mounting of a grease fitting.

Reference is next made to FIG. 5 which illustrates the machining of the outwardly tapered surface 34 at the openng 32.

Figure 8:
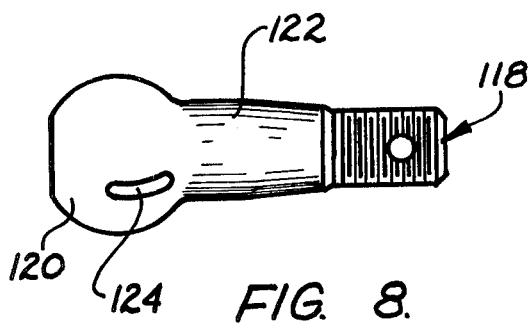
FIG. 8 and FIG. 9 are side and elevational views of a ball stud constructed in accordance with the present invention.
Figure 9:
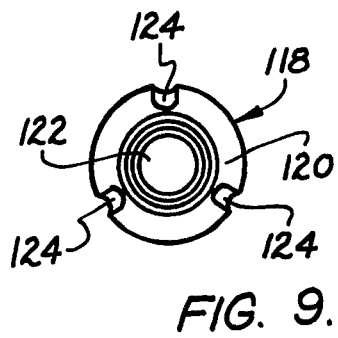

Reference is next made to FIGS. 8 and 9 which illustrate a ball stud constructed in accordance with a modification of the present invention, with such stud being indicated generally at 118. In this embodiment the head portion 120 is provided with longitudinally extending lubrication grooves 124, instead of forming such lubrication grooves in the spherical bearing surface 16 of the housing portion as was the case with the previously described embodiment of FIGS. 1-6.

Figure 10:
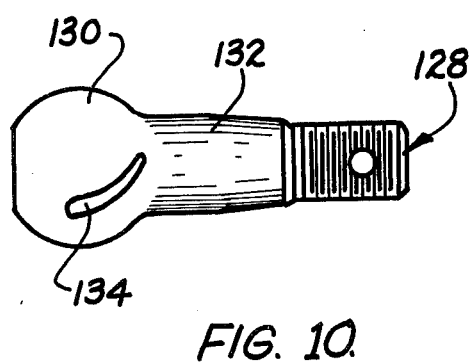
FIG. 10 and FIG. 11 are side and end elevational views of a second ball stud constructed in accordance with the present invention.
Figure 11:
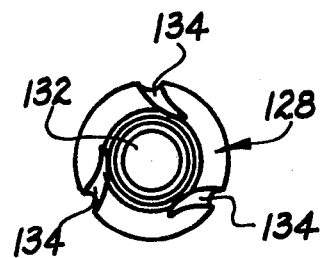

FIGS. 10 and 11 show a modified ball stud construction similar to the embodiment of FIGS. 8 and 9 except that the lubrication grooves 134 are of spirally extending configuration.

In both of the ball stud embodiments illustrated the spiral grooves are positioned so as not to be diametrically opposite one from another so as to eliminate vibratory machine chatter during a finish machining operation later to be described.

Reference is next made to FIGS. 8 and 9 which illustrate a ball stud constructed in accordance with a modification of the present invention and indicated generally at 118. In this embodiment the lubricating grooves 46 are eliminated from the housing seat 22 and instead are formed in the spherical outer surface of the ball stud.

Ball stud 118 is formed from a carbon steel blank which is cold headed to form an enlarged head portion on a shank portion 122 with the head portion including a spherical outer surface 120.

A plurality of spaced lubricating grooves 124 are formed in spherical outer surface 120 during the cold heading operation which forms the head portion on the ball stud. Such lubricating grooves 124 serve as cavities for retaining grease that maintains a film of lubricant at the confronting spherical bearing surfaces 120 on the stud and 22 on the housing.

It has been determined that in the production of certain designs of pivot joints, which include raised bottom shells, or webs, in the bottom of the housing forging, it is also possible to hot forge the flare or tapered wall 34 of the top opening 32 simultaneously with the hot forging of the housing portion 10. This eliminates the need for a separate machining operation to provide the flare 34 needed for angularity of stud movement. However, in such pivot joint designs where the flare 34 can be hot forged, it is not possible to also simultaneously forge the lubricating grooves 46. Hence, it becomes economically desirable to form the lubricating grooves 124 in the spherical outer surface 120 of the ball stud 118.

In accordance with the present invention, the ball stud 118 of FIGS. 8 and 9 can be economically and accurately produced by the following production steps:

1. A carbon steel blank is upset in a cold heading machine to form the shank portion 122 and enlarged head portion that includes the spherical outer surface 120, with the longitudinally extending lubricating grooves 124 being forged into surface 120 by a suitably shaped forging die.
2. The spherical outer surface 120 is next subjected to a machining operation, such as grinding, to accurately establish the spherical radius to specified tolerances for the particular job requirement. For example, with a one inch diameter ball a typical tolerance for automotive applications would be 0.5205–0.5165 spherical radius after grinding.
3. The workpiece is next heat treated to case harden the outer surface. A typical heat treatment would be to carbo-nitride in an atmospheric furnace with a temper at 400 degrees for one hour minimum at heat after quench. This will result in a case depth of 0.006–0.014 with the spherical surface file hard for the typical one inch diameter ball mentioned above.
4. The spherical outer surface 120 is next refined, preferably by a vibratory-slurry treatment wherein the heat treated workpieces are tumbled in a drum type container in the presence of a slurry of water and ceramic pillets. This polishing operation serves to refine the spherical surface by removing surface film which resulted from the above described heat treating operation.

After the finished ball studs 118 have been subjected to the above mentioned steps they are ready to be assembled into the pivot joint, as seen in FIG. 1, with the spherical outer surface 120 pivotally supported on the spherical bearing surface 22 of the housing portion 10.

FIGS. 10 and 11 illustrate a modified ball stud 128 which is identical to the previously described embodiment of FIGS. 8 and 9 except that the lubricating grooves 134 are of spiral configuration instead of straight as was the case with the prior embodiment.

It will be noted that in the case of both ball stud constructions the lubricating grooves are circumferentially spaced at 120 degrees so as to not be located diametrically opposite one another. It has been determined that this spacing arranging eliminates the possibility of vibratory chatter during the machining step.

Further objects and advantages of the present invention will be apparent from the following description, reference being had to the accompanying drawings wherein preferred forms of embodiments of the invention are clearly shown.

What is claimed is:

1. The method of making pivot joints comprising, in combination, forging a workpiece to form a cup-shaped housing portion including a cavity provided with an inner wall, having a bearing wall portion that includes a surface layer of decarbonized metal resulting from said forging; machining said bearing wall portion to remove said layer of decarbonized metal and form a finished bearing surface for pivotally supporting a ball stud; heading a carbon steel blank to form a ball stud comprising a spherical outer surface including lubricating grooves integrally formed during the heading operation; machining said spherical surface; heat treating said ball stud to case harden said spherical outer surface; surface finishing said ball stud to remove surface film said spherical outer surface; and mounting said spherical outer surface of said ball stud on said bearing surface of said housing.

2. The method of making pivot joints comprising, in combination, forming a workpiece to form a cup-shaped housing portion including a cavity provided with an inner wall having a bearing wall portion that includes a surface layer of decarbonized metal resulting from said forging, said inner wall including grease grooves which are integrally formed during said forging operation; machining said bearing wall portion to remove said layer of decarbonized metal and form a finishing bearing surface for pivotally supporting a ball stud heading a carbon steel blank to form a ball stud comprising a spherical outer surface including lubricating grooves integrally formed during the heading operation; machining said spherical surface; heat treating said ball stud to case harden said spherical outer surface; surface finishing said ball stud ro remove suface film from said spherical outer surface; and mounting said spherical outer surface of said ball stud on said bearing surface of said housing.

* * * * *